US012686764B2

(12) United States Patent
Knight et al.

(10) Patent No.: US 12,686,764 B2
(45) Date of Patent: Jul. 21, 2026

(54) WATER SOLUBLE FILM AND ARTICLES COMPRISING SAME

(71) Applicant: MONOSOL, LLC, Merrillville, IN (US)

(72) Inventors: Jonathon Knight, Laporte, IN (US); Ryan Slopek, Merrillville, IN (US)

(73) Assignee: MONOSOL, LLC, Portage, IN (US)

( * ) Notice: Subject to any disclaimer, the term of this patent is extended or adjusted under 35 U.S.C. 154(b) by 590 days.

(21) Appl. No.: 18/181,270

(22) Filed: Mar. 9, 2023

(65) Prior Publication Data

US 2023/0303818 A1     Sep. 28, 2023

Related U.S. Application Data

(60) Provisional application No. 63/321,892, filed on Mar. 21, 2022.

(51) Int. Cl.
*C11D 17/00*          (2006.01)
*C08F 216/06*          (2006.01)
(Continued)

(52) U.S. Cl.
CPC ............ *C08L 29/04* (2013.01); *C08F 216/06* (2013.01); *C08J 5/18* (2013.01); *C08K 5/053* (2013.01); *C08K 5/06* (2013.01); *C11D 17/042* (2013.01); *C08F 2800/10* (2013.01); *C08J 2329/04* (2013.01); *C08J 2403/02* (2013.01); *C08J 2429/04* (2013.01); *C08L 2203/162* (2013.01); *C08L 2205/025* (2013.01); *C08L 2205/06* (2013.01)

(58) Field of Classification Search
None
See application file for complete search history.

(56) References Cited

U.S. PATENT DOCUMENTS

| | | |
|---|---|---|
| 2016/0102278 A1 | 4/2016 | Labeque et al. |
| 2017/0218146 A1 | 8/2017 | Childers et al. |

(Continued)

OTHER PUBLICATIONS

International Application No. PCT/US2023/014899, International Search Report and Written Opinion, mailed Jul. 19, 2023.

(Continued)

*Primary Examiner* — Necholus Ogden, Jr.
(74) *Attorney, Agent, or Firm* — MARSHALL, GERSTEIN & BORUN LLP

(57)          ABSTRACT

A water-soluble film for packaging oxidizing agents including a polyvinyl alcohol resin and a plasticizer, the polyvinyl alcohol resin comprising about 70% to about 100% of a polyvinyl alcohol copolymer including a maleate unit, wherein (a) when the polyvinyl alcohol copolymer comprises less than 100% of the polyvinyl alcohol resin, the balance of the resin comprises a polyvinyl alcohol homopolymer; (b) when the polyvinyl alcohol copolymer comprises 100% of the polyvinyl alcohol resin and the film comprises a starch, the plasticizer comprises sorbitol and glycerol; and (c) when the polyvinyl alcohol resin comprises a blend of polyvinyl alcohol polymers and the polyvinyl alcohol copolymer is provided in an amount in a range of about 70% to about 90%, by weight, and the film comprises starch, then the film does not include sorbitol and/or glycerol; and the film is characterized by an elongation at break of at least about 25%.

21 Claims, 2 Drawing Sheets

| Grade | Description of Residue | Example |
|---|---|---|
| Grade 0 | No residue | |

(51) Int. Cl.
| | |
|---|---|
| C08J 5/18 | (2006.01) |
| C08K 5/053 | (2006.01) |
| C08K 5/06 | (2006.01) |
| C08L 29/04 | (2006.01) |
| C11D 17/04 | (2006.01) |

(56)                     References Cited

U.S. PATENT DOCUMENTS

| | | |
|---|---|---|
| 2018/0118906 A1 | 5/2018 | Lee et al. |
| 2022/0186155 A1* | 6/2022 | Courchay ............. B65D 75/26 |

OTHER PUBLICATIONS

International Application No. PCT/US2023/014899, Invitation to Pay Additional Fees and, Where Applicable, Protest Fee, mailed May 25, 2023.

* cited by examiner

| Grade | Description of Residue | Example |
|-------|------------------------|---------|
| FIG. 1<br>Grade 0 | No residue | |
| FIG. 2<br>Grade 1 | Small specs ≤0.5 cm | |
| FIG. 3<br>Grade 2 | Low residue >1cm <2cm | |
| FIG. 4<br>Grade 3 | Medium residue >2cm <3cm | |
| FIG. 5<br>Grade 4 | Medium to high residue >3cm <4cm | |

Grade 5

Heavy residue ≥4cm

WATER SOLUBLE FILM AND ARTICLES COMPRISING SAME

CROSS-REFERENCE TO RELATED APPLICATION

This application claims the benefit under 35 U.S.C. § 119(e) of U.S. Provisional Patent Application No. 63/321,892, filed Mar. 21, 2022, the entire disclosure of which is incorporated herein by reference.

FIELD

The present disclosure relates generally to water soluble films and related articles. More particularly, the disclosure relates to water soluble films suitable for forming unit dose articles encompassing bleaching agents.

BACKGROUND

Water soluble polymeric films are commonly used as packaging materials to simplify dispersing, pouring, dissolving and dosing of a material to be delivered. Advantageously, this provides for accurate dosing while eliminating the need for the user to measure the composition. The pouched composition may also reduce mess that would be associated with dispensing a similar composition from a vessel, such as pouring a composition from a bottle. In sum, soluble pre-measured polymeric film pouches provide for convenience in a variety of applications.

Bleaches, such as persulfates, are typically used to bleach hair proteins. Persulfates themselves are not water soluble, have low viscosity, and do not attach to hair very will to enable completion of the bleaching process. Often, persulfates are bound with water soluble polymers such as polyvinyl alcohol, cellulosics, starches, and other synthetic water soluble/swellable polymer systems in order to increase the viscosity and hold the bleach to the hair while the bleaching process takes place, and then rinsed off the hair later.

However, these polymer/bleach compositions are hygroscopic which creates obstacles for primary and secondary packaging of the bleach/polymer compositions. Because the polymers can pull moisture out of primary and secondary packaging materials, upon storage, the primary and secondary packaging materials can become brittle and break during transport or if dropped by an end user. Further, when primary packages, such as single unit dose pouches, for the bleach/polymer compositions are prepared from water soluble polymers, the bleach/polymer compositions out compete the water soluble polymer of the packaging for available water in the developing solution, resulting in non-solubilized residue of the primary packaging materials.

Accordingly, there is a need in the art to provide a water soluble film for primary packaging of bleach/polymer compositions that can demonstrate reduced residue and demonstrate reduced brittleness after contact with a bleaching agent.

SUMMARY

One aspect of the disclosure provides a water-soluble film for packaging oxidizing agents, the film comprising a water soluble mixture of a polyvinyl alcohol resin and a plasticizer, the polyvinyl alcohol resin includes about 70% to about 100% of a polyvinyl alcohol copolymer including a maleate unit, based on the total weight of the polyvinyl alcohol resin, wherein (a) when the polyvinyl alcohol copolymer includes less than 100% of the polyvinyl alcohol resin, the balance of the polyvinyl alcohol resin is a polyvinyl alcohol homopolymer; (b) when the polyvinyl alcohol copolymer includes 100% of the polyvinyl alcohol resin and the film comprises a starch, then the plasticizer comprises sorbitol and glycerol; and (c) when the polyvinyl alcohol resin includes a blend of the polyvinyl alcohol copolymer and the polyvinyl alcohol homopolymer and (i) the polyvinyl alcohol copolymer is provided in an amount in a range of about 70% to about 90%, by weight, based on the total weight of the polyvinyl alcohol resin and (ii) the film comprises a starch, then the film does not include sorbitol and/or glycerol; and wherein the film is characterized by an elongation at break of at least about 25% after the film is stored in contact with bleach for 8 weeks at 38° C. and 50% relative humidity (RH).

Another aspect of the disclosure provides a water-soluble unit dose article comprising at least one compartment and optionally a composition housed in the compartment, wherein the unit dose article comprises a water-soluble film of the disclosure, wherein the film is characterized by an elongation at break of at least about 25% after the film is stored in contact with a bleach for 8 weeks at 38° C. and 50% relative humidity (RH) and wherein the water-soluble film comprises at least one wall of the compartment.

For the compositions and methods described herein, optional features, including but not limited to components, compositional ranges thereof, substituents, conditions, and steps are contemplated to be selected from the various aspects, embodiments, and examples provided herein.

Further aspects and advantages will be apparent to those of ordinary skill in the art from a review of the following detailed description, taken in conjunction with the drawings. While the film, article, pouch, and their methods of making and use are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

For further facilitating the understanding of the present invention, 6 drawing figures are appended hereto.

FIG. 1 shows an example of a Residue Value of Grade 0.
FIG. 2 shows an example of a Residue Value of Grade 1.
FIG. 3 shows an example of a Residue Value of Grade 2.
FIG. 4 shows an example of a Residue Value of Grade 3.
FIG. 5 shows an example of a Residue Value of Grade 4.

DETAILED DESCRIPTION

Figure 6:
FIG. 6 shows an example of a Residue Value of Grade 5.

The disclosure provides water soluble films for packaging oxidizing agents, articles prepared from such water soluble films, and methods of making and using same. The water soluble films of the disclosure include a water soluble mixture of a polyvinyl alcohol resin and a plasticizer, the polyvinyl resin comprising about 70% to about 100% of a polyvinyl alcohol copolymer including a maleate unit, based on the total weight of the polyvinyl alcohol resin, wherein (a) when the polyvinyl alcohol copolymer makes up less than 100% of the polyvinyl alcohol resin, the balance of the polyvinyl alcohol resin comprises a polyvinyl alcohol homopolymer;

(b) when the polyvinyl alcohol copolymer makes up 100% of the polyvinyl alcohol resin and then film includes a starch, then the plasticizer includes sorbitol and glycerol; and (c) when the polyvinyl alcohol resin includes a blend of the polyvinyl alcohol copolymer and the polyvinyl alcohol homopolymer and (i) the polyvinyl alcohol copolymer is provided in an amount in a range of about 70% to about 90%, by weight, based on the total weight of the polyvinyl alcohol resin and (ii) the film comprises a starch, then the film does not include sorbitol and/or glycerol; and wherein the film is characterized by an elongation at break of at least about 25% after the film is stored in contact with bleach for 8 weeks at 38° C. and 50% relative humidity (RH).

As described below, the film described herein and pouches prepared therefrom, surprisingly provides one or more benefits, including but not limited to (a) an elongation of at least 25% as determined according to the Elongation Test disclosed herein and/or (b) a residue value of less than 3 as determined according to the Residue Test disclosed herein. In embodiments, the film of the disclosure and pouches prepared therefrom demonstrate at least benefits (a) described above. In some embodiments, the film of the disclosure and pouches prepared therefrom demonstrate at least benefit (b) described above. In some embodiments, the film of the disclosure and pouches prepared therefrom demonstrate each of (a) and (b).

"Comprising" as used herein means that various components, ingredients or steps that can be conjointly employed in practicing the present disclosure. Accordingly, the term "comprising" encompasses the more restrictive terms "consisting essentially of" and "consisting of." The present compositions can comprise, consist essentially of, or consist of any of the required and optional elements disclosed herein. For example, a packet can "consist essentially of" a film described herein, while including a secondary film (e.g., lid portion), and optional markings on the film, e.g. by inkjet printing. The invention illustratively disclosed herein suitably may be practiced in the absence of any element or step which is not specifically disclosed herein.

Films, such as those made in accordance with the disclosure, are defined by the polymer industry (Encyclopedia of Polymer Science and Technology, John Wiley & Sons, Inc., 1967, Vol. 6, page 764) as "shaped plastics that are comparatively thin in relation to their breadth and width and have a maximum thickness of 0.010 in."

Self-supporting films are those capable of supporting their own weight. Uniform films refer to those which are virtually free of breaks, tears, holes, bubbles, and striations.

To be considered a water-soluble film according to the present disclosure, the film, at a thickness of about 1.5 mil (about 0.038 mm), dissolves in 300 seconds or less in water at a temperature of 20° C. (68° F.) in accordance with MonoSol Test Method MSTM-205.

As used herein, the terms packet(s) and pouch(es) should be considered interchangeable. In certain embodiments, the terms packet(s) and pouch(es), respectively, are used to refer to a container made using the film and a sealed container preferably having a material sealed therein, e.g., in the form of a measured dose delivery system. The sealed pouches can be made from any suitable method, including such processes and features such as heat sealing, solvent welding, and adhesive sealing (e.g., with use of a water-soluble adhesive).

All percentages, parts and ratios are based upon the total dry weight of the formed film composition and all measurements are made at about 25° C., unless otherwise specified. All such weights as they pertain to listed ingredients are based on the active level and therefore do not include carriers or by-products that may be included in commercially available materials, unless otherwise specified.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

The dimensions and values disclosed herein are not to be understood as being strictly limited to the exact numerical values recited. Instead, unless otherwise specified, each such dimension is intended to include both the recited value and a functionally equivalent range surrounding that value. For example, a dimension disclosed as "15 mm" is intended to include "about 15 mm," and "about 15 mm" can include a range of from 14.5 mm to 15.4 mm, e.g. by numerical rounding.

As used herein and unless specified otherwise, the terms "wt. %" and "wt %" are intended to refer to the composition of the identified elements in "dry" (non water) parts by weight of the entire film (when applicable) or parts by weight of the entire composition enclosed within a pouch (when applicable). As used herein and unless specified otherwise, the term "PHR" is intended to refer to the composition of the identified element in parts per one hundred parts water soluble polymer (or resin; whether polyvinyl alcohol or otherwise) in the water soluble film.

The film can be made by a solution casting method. The film can be used to form an article or a pouch by any suitable process, including thermoforming and, for example, solvent sealing or heat sealing of film layers around a periphery of the article. The pouches can be used for dosing materials to be delivered into bulk water, for example.

The films, articles, pouches, and related methods of making and use are contemplated to include embodiments including any combination of one or more of the elements, features, and steps further described below (including those shown in the Examples and figures), unless stated otherwise.

Water Soluble Films

The film and related articles and pouches described herein can comprise a plasticized, water soluble film. The water soluble film can be solution cast. The films optionally further include one or more additives selected from fillers, surfactants, anti-block agents, antioxidants, antifoams, bleaching agents, aversive agents, pungents, other functional ingredients, and combinations of the foregoing. In one aspect, the water soluble film can comprise a total of at least about 50 wt % of a PVOH resin comprising one or more PVOH polymers.

The film can have any suitable thickness, and film thicknesses of about 76 microns (μm) or 88 microns are typical and particularly contemplated. Other values and ranges contemplated include values in a range of about 5 to about 200 μm, or in a range of about 20 to about 100 μm, or about 60 to about 120 μm, or about 70 to about 100 μm, or about 40 to about 90 μm, or about 50 to about 80 μm, or about 60 to about 65 μm, or about 20 to about 60 μm, or about 20 to about 50 μm, or about 30 to about 40 μm, for example about 35 μm, about 36 μm, about 50 μm, about 65 μm, about 76 μm, about 88 μm, or about 90 μm.

PVOH Resins

The film described herein can include one or more polyvinyl alcohol (PVOH) polymers to make up the PVOH resin content of the film, and can include a PVOH copolymer resin.

Polyvinyl alcohol is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (about 60° C.). If a sufficient number of acetate groups are allowed to remain after the hydrolysis of polyvinyl acetate, that is, the PVOH polymer is partially hydrolyzed, then the polymer is more weakly hydrogen-bonded, less crystalline, and is generally soluble in cold water—less than about 50° F. (about 10° C.). As such, the partially hydrolyzed polymer is a vinyl alcohol-vinyl acetate copolymer that is a PVOH copolymer, but is commonly referred to as homopolymer PVOH.

In particular, the PVOH resin can include a partially or fully hydrolyzed PVOH copolymer that includes an anionic monomer unit, a vinyl alcohol monomer unit, and optionally a vinyl acetate monomer unit. In various embodiments, the anionic monomer unit can be one or more of vinyl acetic acid, alkyl acrylates, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, itaconic acid, monomethyl itaconate, dimethyl itaconate, itaconic anhydride, citraconic acid, monoalkyl citraconate, dialkyl citraconate, citraconic anhydride, mesaconic acid, monoalkyl mesaconate, dialkyl mesaconate, glutaconic acid, monoalkyl glutaconate, dialkyl glutaconate, glutaconic anhydride, vinyl sulfonic acid, alkyl sulfonic acid, ethylene sulfonic acid, 2-acrylamido-1-methyl propane sulfonic acid, 2-acrylamide-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations of the foregoing (e.g., multiple types of anionic monomers or equivalent forms of the same anionic monomer). For example, the anionic monomer can include one or more of monomethyl maleate and alkali metal salts thereof (e.g. sodium salts).

In one type of embodiment, the PVOH is a carboxyl group modified copolymer. In another aspect, the PVOH can be modified with a dicarboxyl type monomer. In one class of these embodiments, the α carbon of the carbonyl is contacted to the unsaturated bond (e.g., maleic acid, fumaric acid). In another class of these embodiments, the α carbon of the carbonyl is contacted to the unsaturated bond with a methyl branch (e.g., citraconic acid, mesaconic acid). In another class of these embodiments, the β carbon of the carbonyl is contacted to the unsaturated bond (e.g., itaconic acid, cis-glutaconic acid, trans-glutaconic acid). Monomers that provide alkyl carboxyl groups are contemplated. A maleate type (e.g., dialkyl maleate, including monomethyl maleate) or itaconate type (e.g., itaconic acid) comonomer is particularly contemplated. In embodiments, the maleate unit of the polyvinyl alcohol copolymer including a maleate unit can comprise maleic acid, monoalkyl maleate, dialkyl maleate, maleic anhydride, an alkali metal salt of any of the foregoing, an ester of any of the foregoing, or a combination of any of the foregoing.

In embodiments, the polyvinyl alcohol resin comprises a polyvinyl alcohol copolymer including a maleate unit. In refinements of the foregoing embodiments, the polyvinyl alcohol copolymer including a maleate unit may include one or more monomer units selected from maleic acid, monoalkyl maleate, dialkyl maleate, maleic anhydride, and alkali metal salts thereof. The polyvinyl alcohol copolymer including a maleate unit may be a partially or fully hydrolyzed copolymer of polyvinyl acetate and maleic anhydride. In embodiments, the polyvinyl alcohol copolymer including a maleate unit includes at least 0.5 mol % maleate modification and up to about 10 mol % maleate modification, for example, about 1 mol %, about 1.5 mol %, about 1.75 mol %, about 2 mol %, about 2.4 mol %, about 2.5 mol %, about 2.8 mol %, about 3 mol %, about 3.2 mol %, about 3.5 mol %, about 3.8 mol %, about 4 mol %, about 4.2 mol %, about 4.5 mol %, about 5 mol %, about 6 mol %, about 7 mol %, about 8 mol %, about 9 mol %, or about 10 mol %, for example, in a range of about 0.5 mol % to about 10 mol %, about 1.5 mol % to about 8 mol %, about 2 mol % to about 6 mol %, or about 3 mol % to about 5 mol %.

In embodiments when the polyvinyl alcohol resin comprises a blend of polyvinyl alcohol polymers or copolymers, at least one of the polyvinyl alcohol polymers may comprise a polyvinyl alcohol copolymer including a maleate unit. In some embodiments, the polyvinyl alcohol resin can comprise about 70% to about 100%, by weight, of the polyvinyl alcohol copolymer including a maleate unit, based on the total weight of the polyvinyl alcohol resin. In embodiments, when the polyvinyl alcohol copolymer including a maleate unit makes up less than 100% by weight of the polyvinyl alcohol resin, the balance of the blend can comprise a polyvinyl alcohol homopolymer. In embodiments comprising a blend of a polyvinyl alcohol copolymer including a maleate unit and a polyvinyl alcohol homopolymer, the polyvinyl alcohol copolymer including a maleate unit and the polyvinyl alcohol homopolymer can generally be provided in any ratio. In embodiments, the polyvinyl alcohol copolymer including a maleate unit can be provided in an amount in a range of about 70% to about 90%, by weight, of the polyvinyl alcohol resin blend, based on the total weight of the polyvinyl alcohol resin. In embodiments, the polyvinyl alcohol copolymer including a maleate unit can be provided in an amount in a range of about 70% to about 90%, by weight, of the polyvinyl alcohol resin blend, and the polyvinyl alcohol homopolymer makes up the balance of the resin blend. In embodiments, the polyvinyl alcohol copolymer including a maleate unit can be provided in an amount in a range of about 70% to about 100%, by weight, based on the total weight of the polyvinyl alcohol resin, for example, in a range of about 70% to about 95%, about 70% to about 90%, about 70% to about 85%, about 70% to about 80%, for example, about 75% based on the total weight of the polyvinyl alcohol resin, and a polyvinyl alcohol homopolymer can make up the balance of the polyvinyl alcohol resin. In embodiments, the polyvinyl alcohol resin consists of or consists essentially of polyvinyl alcohol copolymer including a maleate unit and polyvinyl alcohol homopolymer.

The amount of PVOH resin in the film can be in a range of about 55 to about 95% by weight based on the total weight of the film, or about 60% to 90%, or about 65% to about 85%, for example.

The total PVOH resin content of the film can have a degree of hydrolysis (D.H. or DH) of at least 80%, 84%, or 85% and at most about 99.7%, 98%, or 96%, for example in a range of about 84% to about 90%, or 85% to 88%, or 86.5%, or in a range of 88% to 95%, about 89% to 93%, or 89.5% to 92%, for example, about 89%, about 90%, about 92%, about 93%, about 94%, about 95%, or about 96%. As used herein, the degree of hydrolysis is expressed as a mole percentage of vinyl acetate units converted to vinyl alcohol units.

In embodiments including a polyvinyl alcohol copolymer such as a polyvinyl alcohol copolymer including maleate units, the degree of hydrolysis of the copolymer can be in a range of about 70% to about 100%, or about 80% to about 99%, or about 85% to about 98%, or about 88% to about 98%, or about 88% to about 94%, or about 88% to about 92%.

In embodiments including a polyvinyl alcohol homopolymer, the degree of hydrolysis of the copolymer can be in a range of about 70% to about 99%, or about 75% to about 95%, or about 78% to about 90%, or about 80% to about 90% or about 85% to about 90%. In embodiments, the polyvinyl alcohol homopolymer can have a degree of hydrolysis in a range of about 85% to about 90% or about 86% to about 89%.

The degree of hydrolysis of a resin blend can also be characterized by the arithmetic weighted, average degree of hydrolysis ($\overline{H^o}$). For example, $\overline{H^o}$ for a PVOH resin that comprises two or more PVOH polymers is calculated by the formula $\overline{H^o} = \Sigma(W_i \cdot H_i)$ where $W_i$ is the weight percentage of the respective PVOH polymer and $H_i$ is the respective degrees of hydrolysis.

The viscosity of a PVOH polymer ($\mu$) is determined by measuring a freshly made solution using a Brookfield LV type viscometer with UL adapter as described in British Standard ENISO 15023-2:2006 Annex E Brookfield Test method. It is international practice to state the viscosity of 4% (w/v) aqueous polyvinyl alcohol solutions at 20° C. All viscosities specified herein in Centipoise (cP) should be understood to refer to the viscosity of 4% (w/v) aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution.

Suitable PVOH resins, for use individually or in combinations, can have viscosities in a range of about 3 cP to about 40 cP, or about 5 cP to about 38 cP, or about 10 cP to about 36 cP, or about 10 cP to about 20 cP, or about 12 cP to about 20 cP, or about 14 cP to about 19 cP, or about 3 cP to about 30 cP, or about 5 cP to about 25 cP, or about 5 cP to about 15 cP, or about 5 cP to about 10 cP, or about 5 cP to about 7 cP, or about 12 cP to about 34 cP, or about 14 cP to about 32 cP, or about 18 cP to about 30 cP, about 20 cP to about 28 cP, about 21 cP to about 26 cP, for example, 32 cP, or 26 cP, or 23.5 cP, or 21 cP, or 19 cP, or 16.5 cP, or 14 cP, or 6 cP. It is well known in the art that the viscosity of PVOH resins is correlated with the weight average molecular weight ($\overline{M}w$) of the PVOH resin, and often the viscosity is used as a proxy for the $\overline{M}w$. When referring to the viscosity of a PVOH resin comprising a PVOH polymer blend, the weighted natural log average viscosity ($\overline{\mu}$) is used. The $\overline{\mu}$ for a PVOH resin that comprises two or more PVOH polymers is calculated by the formula $\overline{\mu} = e^{\Sigma W_i \cdot \ln\mu_i}$ where $\mu_i$ is the viscosity for the respective PVOH polymers.

In embodiments including a polyvinyl alcohol homopolymer, the polyvinyl alcohol homopolymer can have a viscosity in a range of about 3 cP to about 30 cP, or about 5 cP to about 25 cP, or about 5 cP to about 15 cP, or about 5 cP to about 10 cP, or about 5 cP to about 7 cP. In embodiments, the polyvinyl alcohol homopolymer can have a viscosity in a range of 5 cP to about 10 cP or about 5 cP to about 7 cP.

Other water soluble polymers for use in addition to the PVOH copolymer in the film can include, but are not limited to polyacrylates, water soluble acrylate copolymers, polyvinyl pyrrolidone, polyethyleneimine, pullulan, water soluble natural polymers including, but not limited to, guar gum, gum Acacia, xanthan gum, carrageenan, pectin, amylopectin, alginic acid and salts thereof, and starch, water soluble polymer derivatives including, but not limited to, modified starches, ethoxylated starch, and hydroxypropylated starch, copolymers of the forgoing and combinations of any of the foregoing. Yet other water soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. In embodiments, the film can include a polyethyleneimine, a polyvinyl pyrrolidone, a polyalkylene oxide, a polyacrylamide, a cellulose ether, a cellulose ester, a cellulose amide, a polyvinyl acetate, a polyamide, a gelatin, a methylcellulose, a carboxymethylcellulose, a carboxymethyl cellulose salt, a dextrin, an ethylcellulose, a hydroxyethyl cellulose, a hydroxypropyl methylcellulose, a maltodextrin, a starch, a modified starch, guar gum, gum Acacia, xanthan gum, carrageenan, a polyacrylate, a polyacrylate salt, and a copolymer of any of the foregoing Such water soluble polymers, whether PVOH or otherwise, are commercially available from a variety of sources.

Plasticizers

A plasticizer is a liquid, solid, or semi-solid that is added to a material (usually a resin or elastomer) making that material softer, more flexible (by decreasing the glass-transition temperature of the polymer), and easier to process. At low plasticizer levels, films may become brittle, difficult to process, or prone to breaking. At elevated plasticizer levels, films may be too soft, weak, or difficult to process for a desired use. Water is recognized as a very efficient plasticizer for PVOH and other polymers; including but not limited to water soluble polymers, however, the volatility of water makes its utility limited as polymer films need to have at least some resistance (robustness) to a variety of ambient conditions including low and high relative humidity.

The water soluble films of the disclosure further include a plasticizer. The plasticizer can include, but is not limited to, glycerol, diglycerol, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane (TMP), polyether polyols, 2-methyl-1,3-propanediol (e.g. MP Diol®), ethanolamines, and mixtures thereof. In some embodiments, the plasticizer is selected from glycerol, diglycerol, propylene glycol, ethylene glycol, diethylene glycol, dipropylene glycol, polyethylene glycols up to MW 400, sorbitol, 2-methyl-1,3-propanediol, trimethylolpropane, polyether polyols, and combinations of the foregoing. In one type of embodiment, the plasticizer is selected from the group of sorbitol, glycerol, propylene glycol, 2-methyl-1,3-propanediol, trimethylolpropane, dipropylene glycol, and a combination thereof. In one type of embodiment, the plasticizer is selected from glycerol, propylene glycol, sorbitol, 2-methyl-1,3-propanediol and combinations of the foregoing. In another type of embodiment, the plasticizer includes glycerol, sorbitol, or a combination of the foregoing. In one type of embodiment, the plasticizer is selected from the group of triethylene glycol, sorbitol, glycerol, diglycerin, ethylene glycol, diethylene glycol, dipropylene glycol, tetraethylene glycol, propylene glycol, polyethylene glycols up to 400 Da molecular weight, hexylene glycol, xylitol, 2-methyl-1,3,propanediol, ethanolamines, or a combination thereof. In one type of embodiment, the plasticizer comprises triethylene glycol, polyethylene glycol having a molecular weight of about 200 Da, sorbitol, glycerol, or a combination thereof. In one type of embodiment, the plasticizer comprises triethylene glycol, polyethylene glycol having a molecular weight of about 200 Da, or a combination thereof.

The total amount of the non-water plasticizer can be in a range of about 10 to about 40 weight parts per one hundred parts PVOH resin (PHR), or about 15 to about 23 PHR, or about 18 to about 23 PHR, or about 25 to about 30 PHR, for example, about 21 PHR, about 22 PHR, about 23 PHR, about 25 PHR, about 27 PHR, or about 28 PHR. In embodiments, the plasticizer can be provided in an amount in a range of about 15 to about 40 PHR, about 18 to about 23 PHR, or about 25 to about 30 PHR. In embodiments, the plasticizer can comprise triethylene glycol, polyethylene glycol having a molecular weight of about 200 Da, or a combination thereof, and can be provided in a range of about 18 to about 23 PHR. In embodiments, the plasticizer can comprise triethylene glycol, polyethylene glycol having a molecular weight of about 200 Da, sorbitol, glycerol, or a combination thereof and can be provided in an amount in a range of about 25 to about 30 PHR.

The water soluble film can contain other auxiliary agents and processing agents, such as, but not limited to, surfactants, lubricants, release agents, fillers, extenders, crosslinking agents, antiblocking agents, antioxidants, detackifying agents, antifoams (defoamers), nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes.

Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. In various embodiments, the amount of surfactant in the water soluble film can be in a range of about 0.1 wt % to 4.0 wt %, or about 1.0 wt % to 3.0 wt %, or about 1.5 wt % to about 2.5 wt %, or about 0.1 PHR to about 9 PHR, or about 0.1 to about 8 PHR, or about 0.1 to about 6 PHR, or about 0.5 PHR to about 2.9 PHR, or about 0.5 PHR to about 1.5 PHR, or about 1 PHR to about 6 PHR, or about 1.5 PHR to about 5 PHR, or about 2 PHR to about 4 PHR, for example.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc, mica, stearic acid and metal salts thereof, for example, magnesium stearate. Preferred materials are starches, modified starches and silica. When included in the water soluble film, the starch, modified starch, and/or silica can be provided in a range of about 1 PHR to about 35 PHR, or about 5 PHR to about 30 PHR, about 20 PHR to about 30 PHR, or about 10 PHR to about 15 PHR, or about 23 PHR to about 27 PHR, for example, less than about 30 PHR, less than about 20 PHR, or less than about 15 PHR. In some embodiments, the films can be substantially free of starch, modified starch, and/or silica. As used herein, and unless stated otherwise, "substantially free of starch, modified starch, and/or silica" refers to films having starch, modified starch, and/or silica present in an amount of less than about 500 ppm. For example, less than about 400 ppm, less than about 300 ppm, less than about 200 ppm, or less than about 100 ppm.

An anti-block agent (e.g. stearic acid or salt thereof) when present in the film, can be present in the film in an amount of at least 0.1 PHR, or at least 0.5 PHR, or at least 1 PHR, or in a range of about 0.1 to 5.0 PHR, or about 0.1 to about 3.0 PHR, or about 0.4 to 1.0 PHR, or about 0.5 to about 0.9 PHR, or about 0.2 to about 0.8 PHR, or about 0.5 to about 1.5 PHR, for example 0.4 PHR, 0.5 PHR, 0.6 PHR, 0.7 PHR, 0.8 PHR, or 0.9 PHR.

Processes for solvent casting of PVOH are well-known in the art. For example, in the film-forming process, the polyvinyl alcohol resin(s) and secondary additives are dissolved in a solvent, typically water, metered onto a surface, allowed to substantially dry (or force-dried) to form a cast film, and then the resulting cast film is removed from the casting surface. The process can be performed batch wise, and is more efficiently performed in a continuous process.

In the formation of continuous films of polyvinyl alcohol, it is the conventional practice to meter a solution of the solution onto a moving casting surface, for example, a continuously moving metal drum or belt, causing the solvent to be substantially removed from the liquid, whereby a self-supporting cast film is formed, and then stripping the resulting cast film from the casting surface.

Optionally, the water soluble film can be a free-standing film consisting of one layer or a plurality of like layers.

In embodiments, the water soluble film can comprise a polyvinyl alcohol resin wherein the polyvinyl alcohol copolymer including a maleate unit makes up 100% of the polyvinyl alcohol polymers in the resin, a starch, and the plasticizer comprises sorbitol and glycerol. In embodiments, the water soluble film can comprise a polyvinyl alcohol resin comprising a blend of polyvinyl alcohol polymers, wherein the polyvinyl alcohol copolymer including a maleate unit makes up about 70% to about 90%, by weight, of the polyvinyl alcohol polymers in the resin blend, based on the total weight of the resin blend, and the balance of polyvinyl alcohol polymers in the resin blend comprises polyvinyl alcohol homopolymer, the film further includes a starch, and the film does not include sorbitol and/or glycerol.

Without intending to be bound by theory, it is believed that when a film comprises a polyvinyl alcohol resin comprising 100% of the polyvinyl alcohol copolymer including a maleate unit, then the introduction of starch into the film decreases the elongation at break, resulting in a more brittle film after storage in contact with a bleaching agent. However, without intending to be bound by theory, it is believed that the presence of sorbitol and/or glycerol in the film can help negate the effect of starch on the elongation at break, thereby providing a film that is more robust to breakage, relative to a film including 100% of the polyvinyl alcohol copolymer including a maleate unit and starch that does not include sorbitol and glycerol.

Further, without intending to be bound by theory it is believed that when a film comprises a polyvinyl alcohol resin made up of about 70% to about 90% of the polyvinyl alcohol copolymer including a maleate unit and 10% to 30% of a polyvinyl alcohol homopolymer, then the introduction of starch into the film decreases the elongation at break, resulting in a more brittle film after storage in contact with a bleaching agent. However, without intending to be bound by theory, and in contrast to films including 100% of the polyvinyl alcohol copolymer, when sorbitol and/or glycerol are included in a film comprising about 70% to about 90% of the polyvinyl alcohol copolymer including a maleate unit and about 10% to about 30% of a polyvinyl alcohol copolymer, the presence of the sorbitol and/or glycerol compounds the decrease in the elongation at break, thereby providing a film that is more brittle and prone to breakage, relative to a film including about 70% to about 90% of the polyvinyl alcohol copolymer including a maleate unit and about 10% to about 30% of a polyvinyl alcohol copolymer and starch, and not including sorbitol and/or glycerol.

The water soluble films of the disclosure can be characterized by the elongation at break as determined according to the Elongation Test herein. In general, the water soluble films of the disclosure have an elongation at break of at least about 25%, for example, at least about 50%, at least about 75%, at least about 100%, at least about 125%, at least about 150%, at least about 175%, at least about 200% or at least about 225%. Without intending to be bound by theory, it is believed that as the elongation at break as determined according to the Elongation Test herein increases, the brittleness of the film after storage in contact with a bleaching agent decreases, thereby providing resiliency to a unit dose package prepared from the water soluble film and encompassing a bleaching agent to breaking during transport and if dropped by an end user. In embodiments, the water soluble films of the disclosure can have an elongation at break in a range of about 25% to about 500%, about 25% to about 250%, about 50% to about 500%, about 50% to about 400%, about 50% to about 300%, about 50% to about 250%, about 100% to about 500%, about 100% to about 400%, about 100% to about 300%, about 100% to about 250%, about 150% to about 500%, about 150% to about 400%, about 150% to about 300%, about 150% to about 250%, about 200% to about 500%, about 200% to about 300%, or about 300% to about 250%.

The water soluble films of the disclosure can also be characterized by a residue value determined according to the Residue Test herein. In embodiments, the water soluble films of the disclosure can have a residue value of 3, 2, 1, or 0. In embodiments, the water soluble films of the disclosure can have a residue value of 3 or less. In embodiments, the water soluble films of the disclosure can have a residue value of 2 or less. In embodiments, the water soluble films of the disclosure can have a residue value of 1 or less.

In embodiments, the water soluble films of the disclosure can have an elongation at break of at least 25% and a residue value of 2 or less. In embodiments, the water soluble films of the disclosure can have an elongation at break of at least 25% and a residue value of 1 or less. In embodiments, the water soluble films of the disclosure can have an elongation at break of at least 50% and a residue value of 3 or less. In embodiments, the water soluble films of the disclosure can have an elongation at break of at least 50% and a residue value of 2 or less. In embodiments, the water soluble films of the disclosure can have an elongation at break of at least 100% and a residue value of 3 or less. In embodiments, the water soluble films of the disclosure can have an elongation at break of at least 100% and a residue value of 2 or less. In embodiments, the water soluble films of the disclosure can have an elongation at break of at least 100% and a residue value of 1 or less. In embodiments, the water soluble films of the disclosure can have an elongation at break of at least 1250% and a residue value of 2 or less. In embodiments, the water soluble films of the disclosure can have an elongation at break of at least 120% and a residue value of 1 or less. In embodiments, the water soluble films of the disclosure can have an elongation at break of at least 200% and a residue value of 3 or less. In embodiments, the water soluble films of the disclosure can have an elongation at break of at least 250% and a residue value of 3 or less.

In embodiments, the water soluble films of the disclosure include a water soluble mixture of a polyvinyl alcohol resin and a plasticizer, the polyvinyl alcohol resin comprises about 100% by weight of a polyvinyl alcohol copolymer including a maleate unit, based on the total weight of the polyvinyl alcohol resin in the film, the plasticizer comprises sorbitol and glycerol, and the film does not include a starch. In refinements of the foregoing embodiment, the water soluble film is characterized by an elongation at break of at least 200% and has a residue value of 3 or less.

In embodiments, the water soluble films of the disclosure include a water soluble mixture of a polyvinyl alcohol resin and a plasticizer, the polyvinyl alcohol resin comprises about 100% by weight of a polyvinyl alcohol copolymer including a maleate unit, based on the total weight of the polyvinyl alcohol resin in the film, the plasticizer comprises sorbitol and glycerol, and the film includes a starch in an amount of about 30 PHR or less, based on 100 parts of the polyvinyl alcohol resin. In refinements of the foregoing embodiment, the water soluble film is characterized by an elongation at break of at least 25% and has a residue value of 1 or less.

In embodiments, the water soluble films of the disclosure include a water soluble mixture of a polyvinyl alcohol resin and a plasticizer, the polyvinyl alcohol resin comprises a mixture of a polyvinyl alcohol copolymer including a maleate unit and a polyvinyl alcohol homopolymer, wherein the polyvinyl alcohol resin comprises about 75% by weight of the polyvinyl alcohol copolymer including a maleate group, based on the total weight of the polyvinyl alcohol resin in the film, the plasticizer comprises sorbitol and glycerol, and the film does not include a starch. In refinements of the foregoing embodiment, the water soluble film is characterized by an elongation at break of at least 130% and has a residue value of 1 or less.

In embodiments, the water soluble films of the disclosure include a water soluble mixture of a polyvinyl alcohol resin and a plasticizer, the polyvinyl alcohol resin comprises a mixture of a polyvinyl alcohol copolymer including a maleate unit and a polyvinyl alcohol homopolymer, wherein the polyvinyl alcohol resin comprises about 75% by weight of the polyvinyl alcohol copolymer including a maleate group, based on the total weight of the polyvinyl alcohol resin in the film, the film does includes a starch in an amount of about 30 PHR or less, based on 100 parts of the polyvinyl alcohol resin, and the film does not include sorbitol or glycerol. In refinements of the foregoing embodiment, the water soluble film is characterized by an elongation at break of at least 50% and has a residue value of 2 or less.

Water Soluble Articles

The film is useful for creating an article and/or pouch to contain, for example, a bleach composition. The composition contained in the pouch may take any form such as powders, gels, pastes, liquids, tablets or any combination thereof. The film is also useful for any other application in which improved wet handling and low cold water residues are desired. The film forms at least one side wall of the article and/or pouch, optionally the entire article and/or pouch, and preferably an outer surface of the at least one sidewall.

The film described herein can also be used to make an article and/or pouch with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of embodiments is characterized by the level of polymer in the packet material, for example the PVOH copolymer described above, as described above, being at least 60%.

The articles and/or pouches of the present disclosure can include at least one sealed compartment. Thus, the articles and/or pouches may comprise a single compartment or multiple compartments. A water-soluble pouch or sachet can be formed from two layers of water-soluble polymer film sealed at an interface, or by a single film that is folded upon itself and sealed. One or both of the films include the PVOH film described above. The films define an interior article and/or pouch container volume which contains any desired composition for release into an aqueous environment.

The pouch container volume is not particularly limiting. The pouch container volume, in one type of embodiment is 25 mL or less. In another embodiment, the volume is less than 25 mL. The pouch container volume, in another type, is less than 50 mL.

The composition for use in the pouch is not particularly limited. In embodiments comprising multiple compartments, each compartment may contain identical and/or different compositions. In turn, the compositions may take any suitable form including, but not limited to liquid, solid and combinations thereof (e.g. a solid suspended in a liquid). In some embodiments, the pouches comprise a first, second and third compartment, each of which respectively contains a different first, second, and third composition. Liquid detergents are particularly contemplated.

The compartments of multi-compartment articles and/or pouches may be of the same or different size(s) and/or volume(s). The compartments of the present multi-compartment articles and/or pouches can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively, the second and third compartments may be superimposed on the first compartment. However, it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. In some embodiments, the first compartment may be surrounded by at least the second compartment, for example in a tire-and-rim configuration, or in a pouch-in-a-pouch configuration.

The articles and/or pouches of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the article and/or packet may be made from one or more films such that any given packet compartment may comprise walls made from a single film or multiple films having differing compositions. In one embodiment, a multi-compartment article and/or pouch comprises at least three walls: an outer upper wall; an outer lower wall; and a partitioning wall. The outer upper wall and the outer lower wall are generally opposing and form the exterior of the article and/or pouch. The partitioning wall is interior to the article and/or pouch and is secured to the generally opposing outer walls along a seal line. The partitioning wall separates the interior of the multi-compartment article and/or pouch into at least a first compartment and a second compartment.

In one embodiment, the single compartment or plurality of sealed compartments contains a composition. The plurality of compartments may each contain the same or a different composition. The composition is selected from a liquid, solid or combination thereof.

In embodiments, the disclosure provides a unit dose article comprising at least one compartment and optionally a composition housed in the compartment, wherein at least one wall of the compartment comprises a water soluble film of the disclosure.

Article and/or Pouch Contents

In general, the water soluble articles of the disclosure can contain a household care product, a personal care product, or a non-household care product. In embodiments, the unit dose articles include a composition housed in the compartment and the composition comprises an oxidizing agent. In embodiments, the oxidizing agent comprises a hypochlorite salt, a chloramine, a chlorinated isocyanurate, a brominated isocyanurate, a chlorate, a bromate, a perchlorate, a perbromate, calcium hydroxide, calcium chloride, a percarbonate, a perborate, a periodate, a persulfate, a permanganate, a chromate, a dichromate, a nitrate, a nitrite, a peroxide, a ketone peroxide, a peroxy acid, an inorganic acid, or a combination thereof. In embodiments, the oxidizing agent comprises a hypochlorite salt, a chloramine, a chlorinated isocyanurate, calcium hydroxide, calcium chloride, a percarbonate, a perborate, a persulfate, a permanganate, a peroxide, a peroxy acid, or a combination thereof.

In embodiments, at least one wall of the water soluble unit dose articles of the disclosure comprise a water soluble films of the disclosure including a water soluble mixture of a polyvinyl alcohol resin and a plasticizer, the polyvinyl alcohol resin comprising about 100% by weight of a polyvinyl alcohol copolymer including a maleate unit, based on the total weight of the polyvinyl alcohol resin in the film, the plasticizer comprising sorbitol and glycerol, and the film does not include a starch. In refinements of the foregoing embodiment, the water soluble film is characterized by an elongation at break of at least 200% and has a residue value of 3 or less.

In embodiments, at least one wall of the water soluble unit dose articles of the disclosure comprise a water soluble films of the disclosure including a water soluble mixture of a polyvinyl alcohol resin and a plasticizer, the polyvinyl alcohol resin comprising about 100% by weight of a polyvinyl alcohol copolymer including a maleate unit, based on the total weight of the polyvinyl alcohol resin in the film, the plasticizer comprising sorbitol and glycerol, and the film includes a starch in an amount of about 30 PHR or less, based on 100 parts of the polyvinyl alcohol resin. In refinements of the foregoing embodiment, the water soluble film is characterized by an elongation at break of at least 25% and has a residue value of 1 or less.

In embodiments, at least one wall of the water soluble unit dose articles of the disclosure comprise a water soluble films of the disclosure including a water soluble mixture of a polyvinyl alcohol resin and a plasticizer, the polyvinyl alcohol resin comprising a mixture of a polyvinyl alcohol copolymer including a maleate unit and a polyvinyl alcohol homopolymer, wherein the polyvinyl alcohol resin comprises about 75% by weight of the polyvinyl alcohol copolymer including a maleate group, based on the total weight of the polyvinyl alcohol resin in the film, the plasticizer comprises sorbitol and glycerol, and the film does not include a starch. In refinements of the foregoing embodiment, the water soluble film is characterized by an elongation at break of at least 130% and has a residue value of 1 or less.

In embodiments, at least one wall of the water soluble unit dose articles of the disclosure comprise a water soluble films of the disclosure including a water soluble mixture of a polyvinyl alcohol resin and a plasticizer, the polyvinyl alcohol resin comprising a mixture of a polyvinyl alcohol copolymer including a maleate unit and a polyvinyl alcohol homopolymer, wherein the polyvinyl alcohol resin comprises about 75% by weight of the polyvinyl alcohol copolymer including a maleate group, based on the total weight of the polyvinyl alcohol resin in the film, the film does includes a starch in an amount of about 30 PHR or less, based on 100 parts of the polyvinyl alcohol resin, and the film does not include sorbitol or glycerol. In refinements of the foregoing embodiment, the water soluble film is characterized by an elongation at break of at least 50% and has a residue value of 2 or less.

Elongation at Break Test

The procedure includes the determination of elongation at break based on ASTM D 882 ("Standard Test Method for Tensile Properties of Thin Plastic Sheeting") or equivalent. An INSTRON® tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For elongation at break determination, 1"-wide (2.54 cm) samples of a single film sheet having a thickness of 1.4 mil±0.15 (about 35.6±3.8 μm) are prepared. The sample is then conditioned for 8 weeks at 38° C., 50% RH, in contact with a persulfate as a bleaching agent. The sample is then transferred to the INSTRON® tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON® grips having model number 2702-032 faces, which are rubber coated and 25 mm wide, or equivalent). The samples are mounted into the tensile testing machine and analyzed to determine the elongation at break (i.e., where Young's Modulus applies).

Residue Test

The Residue Test qualitatively measures the residual polymer after a water soluble film having a thickness of about 1.4 mil is stored in contact with a bleaching agent for 8 weeks at 38° C. and 50% RH. Specifically, a single pod containing approximately 15 g of persulfate as a bleaching agent is weighed on an analytic balance and the weight is recorded. An identical amount of a commercial hair developer sold as Redken® Pro-Oxide Cream Developer 20 Volume 6%, available from Redken, is weighed into a bowl. The developer is an aqueous hydrogen peroxide formulation having a liquid/cream appearance and 6% by weight hydrogen peroxide. Inactive ingredients include cetearyl alcohol, trideceth-2 carboxamide MEA, Ceteareth-30, glycerin, tetrasodium etidronate, tetrasodium pyrophosphate, sodium salicylate, and phosphoric acid.

The bleach pod is added to the bowl containing the developer (1:1 weight ratio of bleach to developer) and agitated with a brush for 45 seconds. The resulting product is then pushed through a 5×5 inch screen with a 1 mm aperture and any residue is rinsed with methanol. The residue is allowed to dry. Once dry, an image is taken and observations recorded including the approximate residue dimensions and number.

Grading is made by visual observation of the residue remaining in/on the filter. The qualitative scale is 0 (no residues) to 5 (heavy residue ≥4 cm). The film can be characterized by a residue value of at most about 3.0, 2.9, or 2.8, or at most about 2.7, 2.6, 2.5, 2.4, 2.3, 2.2, 2.1, or 2.0. A water-soluble polymer film passes the residue test if the average residue grading for the sixteen trials is less than 3. The following scale, and the corresponding photographs, was used for determining the wash-residue value:

Grade 0: No residues
Grade 1: Small spots of max. 0.5 cm diameter each;
Grade 2: Low residue spots greater than 0.5 cm and max 2 cm;
Grade 3: Medium residue spots greater than 2 cm and max 3 cm;
Grade 4: Medium high residue spots greater than 3 cm and max 4 cm;
Grade 5: Heavy residue greater than 4 cm.

Examples

Water soluble films were prepared using solution casting from a mixture including the ingredients set forth in Table 1, below. The prepared films were tested for elongation and residue as set forth in the Elongation Test and the Residue Test.

| Raw Material | Film C1 | Film C2 | Film C3 | Film 1 | Film 2 | Film 3 | Film 4 | Film 5 | Film 6 |
|---|---|---|---|---|---|---|---|---|---|
| PVOH homopolymer Viscosity 20-25 cP; DH 86-90% | 75 PHR | 75 PHR | 75 PHR | — | — | — | — | — | — |
| PVOH homopolymer Viscosity 10-15 cP; DH 86-90% | 25 PHR | 25 PHR | — | — | — | — | — | — | — |
| PVOH homopolymer Viscosity 5-10 cP; DH 86-99% | — | — | — | — | 25 PHR | — | 25 PHR | 25 PHR | — |
| PVOH homopolymer Viscosity 3-7 cP; DH 70-78% | — | — | 25 PHR | — | — | — | — | — | — |
| PVOH copolymer with maleate unit DH 86-94% | — | — | — | 100 PHR | 75 PHR | 100 PHR | 75 PHR | 75 PHR | 100 PHR |
| starch | 2X | X | X | 2X | 2X | 2X | 2X | — | — |
| Sorbitol | — | — | — | — | Y | Y | — | Y | Y |
| Glycerol | — | — | — | — | Y | Y | — | Y | Y |
| Triethylene Glycol | Z | Z | Z | Z | Z | Z | Z | Z | Z |
| Polyethylene Glycol MW 200 | A | A | A | A | A | A | A | A | A |
| Process Aids | B' | B | B | B' | B' | B | B' | B' | B |
| Elongation at Break (%) after aging 8 weeks in contact with bleach (38° C., 50% RH) | 11.95% | 200% | 200% | 6.68 | 7.24 | 28.78 | 57.09 | 130.38% | 231.93% |
| Residue Value after aging 8 weeks in contact with bleach (38° C., 50% RH) | 4 | >3 | >3 | 1 | 0 | 1 | 1 | 1 | 2 |

As shown in Table 1, films of the disclosure demonstrate one or both advantageous properties of an elongation at break of greater than 25% according to the Elongation Test described herein and/or a residue value of 3 or less, according to the Residue Test disclosed herein.

Because modifications and changes varied to fit particular operating requirements and environments will be apparent to those skilled in the art, the disclosure is not considered limited to the examples chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

Throughout the specification, where the compounds, compositions, articles, methods, and processes are described as including components, steps, or materials, it is contemplated that the compositions, processes, or apparatus can also comprise, consist essentially of, or consist of, any combination of the recited components or materials, unless described otherwise.

What is claimed is:

1. A water-soluble film for packaging oxidizing agents, the film comprising a water soluble mixture of:

a polyvinyl alcohol resin and a plasticizer, the polyvinyl alcohol resin comprising about 70% to about 100% of a polyvinyl alcohol copolymer including a maleate unit, based on the total weight of the polyvinyl alcohol resin and the plasticizer comprising triethylene glycol, polyethylene glycol having a molecular weight of about 200 Da, or a combination thereof, wherein (a) when the polyvinyl alcohol copolymer comprises less than 100% of the polyvinyl alcohol resin, the balance of the polyvinyl alcohol resin comprises a polyvinyl alcohol homopolymer;

(b) when the polyvinyl alcohol copolymer comprises 100% of the polyvinyl alcohol resin and the film comprises a starch, then the plasticizer comprises sorbitol and glycerol; and (c) when the polyvinyl alcohol resin comprises a blend of the polyvinyl alcohol copolymer and the polyvinyl alcohol homopolymer and (i) the polyvinyl alcohol copolymer is provided in an amount in a range of about 70% to about 90%, by weight, based on the total weight of the polyvinyl alcohol resin and (ii) the film comprises a starch, then the film does not include sorbitol and/or glycerol; and wherein the film is characterized by an elongation at break of at least about 25% after the film is stored in contact with a bleach for 8 weeks at 38° C. and 50% relative humidity (RH).

2. The water-soluble film of claim 1, further comprising a starch in an amount of about 30 phr or less based on 100 parts of polyvinyl alcohol resin, or about 20 phr to about 30 phr, or about 15 phr or less, or about 7 phr to about 15 phr.

3. The water-soluble film of claim 1, wherein the maleate unit of the polyvinyl alcohol copolymer comprises maleic acid, monoalkyl maleate, dialkyl maleate, maleic anhydride, an alkali metal salt of any of the foregoing, an ester of any of the foregoing, or a combination of any of the foregoing.

4. The water-soluble film of claim 1, wherein the polyvinyl alcohol copolymer includes the maleate unit in an amount of about 0.5 mol % to about 10 mol %, based on the total monomer units in the copolymer, or about 1.5 mol % to about 8 mol %, about 2 mol % to about 6 mol %, or about 3 mol % to about 5 mol %.

5. The water-soluble film of claim 1, wherein the polyvinyl alcohol copolymer has a degree of hydrolysis (DH) of about 70% to about 100%, or about 80% to about 99%, or about 85% to about 98%, or about 88% to about 98%, or about 88% to about 94%, or about 88% to about 92%.

6. The water-soluble film of claim 1, wherein the polyvinyl alcohol homopolymer has a viscosity in a range of about 3 cP to about 30 cP, or about 5 cP to about 25 cP, or about 5 cP to about 15 cP, or about 5 cP to about 10 cP, or about 5 cP to about 7 cP.

7. The water-soluble film of claim 6, wherein the polyvinyl alcohol homopolymer has a viscosity in a range of 5 cP to about 10 cP or about 5 cP to about 7 cP.

8. The water-soluble film of claim 1, wherein the polyvinyl alcohol homopolymer has a DH in a range of about 70% to about 99%, or about 75% to about 95%, or about 78% to about 90%, or about 80% to about 90% or about 85% to about 90%.

9. The water-soluble film of claim 8, wherein the polyvinyl alcohol homopolymer has a DH in a range of about 85% to about 90% or about 86% to about 89%.

10. The water-soluble film of claim 1, wherein the plasticizer further comprises a plasticizer selected from the group of sorbitol, glycerol, diglycerin, ethylene glycol, diethylene glycol, dipropylene glycol, tetraethylene glycol, propylene glycol, polyethylene glycols up to 400 Da molecular weight, hexylene glycol, xylitol, 2-methyl-1,3, propanediol, ethanolamines, or a combination thereof.

11. The water-soluble film of claim 1, further comprising sorbitol, glycerol, or a combination thereof.

12. The water-soluble film of claim 1, wherein the plasticizer consists of triethylene glycol and polyethylene glycol having a molecular weight of about 200 Da.

13. The water-soluble film of claim 1, wherein the plasticizer consists of triethylene glycol, polyethylene glycol having a molecular weight of about 200 Da, sorbitol, and glycerol.

14. The water-soluble film of claim 1, wherein the plasticizer is provided in an amount of about 15 phr to about 40 phr, based on 100 parts polyvinyl alcohol resin, or about 18 phr to about 23 phr, or about 25 phr to about 30 phr.

15. The water-soluble film of claim 1, wherein the film, when provided at a thickness of about 1.4 mil (34.6 micron) is characterized by a residue value of 3 or less, after storage for 8 weeks at 38° C., 50% RH, when tested in accordance with the Residue Test provided in the specification.

16. The water-soluble film of claim 1, wherein the film, when provided at a thickness of about 1.4 mil (34.6 micron) is characterized by a residue value of 2 or less, after storage in contact with bleach for 8 weeks, when tested in accordance with the Residue Test provided in the specification.

17. The water-soluble film of claim 1, wherein the film comprises a water soluble mixture of a polyvinyl alcohol resin and a plasticizer, the polyvinyl alcohol resin comprises about 100% of a polyvinyl alcohol copolymer including a maleate unit, based on the total weight of the polyvinyl alcohol resin in the film, the plasticizer comprises sorbitol and glycerol, and the film does not include starch.

18. The water-soluble film of claim 1, wherein the film comprises a water soluble mixture of a polyvinyl alcohol resin and a plasticizer, the polyvinyl alcohol resin comprises about 100% of a polyvinyl alcohol copolymer including a maleate unit, based on the total weight of the polyvinyl alcohol resin in the film, the plasticizer comprises sorbitol and glycerol, and the film includes a starch in an amount of about 30 PHR or less, based on 100 parts of the polyvinyl alcohol resin.

19. The water-soluble film of claim 1, wherein the film comprises a water soluble mixture of a polyvinyl alcohol resin and a plasticizer, the polyvinyl alcohol resin comprises a mixture of a polyvinyl alcohol copolymer including a maleate unit and a polyvinyl alcohol homopolymer, wherein the polyvinyl alcohol resin comprises about 75% by weight of the polyvinyl alcohol copolymer including a maleate group, based on the total weight of the polyvinyl alcohol resin, wherein the film does not include starch and the plasticizer includes sorbitol and glycerol.

20. The water-soluble film of claim 1, wherein the film comprises a water soluble mixture of a polyvinyl alcohol resin and a plasticizer, the polyvinyl alcohol resin comprises a mixture of a polyvinyl alcohol copolymer including a maleate unit and a polyvinyl alcohol homopolymer, wherein the polyvinyl alcohol resin comprises about 75% by weight of the polyvinyl alcohol homopolymer, based on the total weight of the polyvinyl alcohol resin, the film includes a starch in an amount of about 30 PHR or less, based on 100 parts of the polyvinyl alcohol resin, and the film does not include starch or glycerol.

21. A water-soluble unit dose article comprising at least one compartment and optionally a composition housed in the compartment, wherein the unit dose article comprises:

a water-soluble film, the water soluble film comprising a polyvinyl alcohol resin and a plasticizer, the polyvinyl alcohol resin comprising about 70% to about 100% of a polyvinyl alcohol-co-maleate polymer, based on the total weight of the polyvinyl alcohol resin and the plasticizer comprising triethylene glycol, polyethylene glycol having a molecular weight of about 200 Da, or a combination thereof, wherein (a) when the polyvinyl alcohol copolymer comprises less than 100% of the polyvinyl alcohol resin, the balance of the polyvinyl alcohol resin comprises a polyvinyl alcohol homopolymer;

(b) when the polyvinyl alcohol copolymer comprises 100% of the polyvinyl alcohol resin and the film comprises a starch, then the plasticizer comprises sorbitol and glycerol; and (c) when the polyvinyl alcohol resin comprises a blend of the polyvinyl alcohol copolymer and the polyvinyl alcohol homopolymer and (i) the polyvinyl alcohol copolymer is provided in an amount in a range of about 70% to about 90%, by weight based on the total weight of the polyvinyl alcohol resin and (ii) the film comprises a starch, then the film does not include sorbitol and/or glycerol; and wherein the film is characterized by an elongation at break of at least about 25% after the film is stored in contact with a bleach for 8 weeks at 38° C. and 50% relative humidity (RH);

wherein the water-soluble film comprises at least one wall of the compartment.

\* \* \* \* \*